United States Patent
Gunnels et al.

(10) Patent No.: US 7,853,820 B2
(45) Date of Patent: *Dec. 14, 2010

(54) SYSTEM AND METHOD FOR DETECTING A FAULTY OBJECT IN A SYSTEM

(75) Inventors: John A. Gunnels, Brewster, NY (US); Fred Gehrung Gustavson, Briarcliff Manor, NY (US); Robert Daniel Engle, St. Louis, MO (US)

(73) Assignee: International Business Machines Corporation, Armonk, NY (US)

( * ) Notice: Subject to any disclaimer, the term of this patent is extended or adjusted under 35 U.S.C. 154(b) by 71 days.

This patent is subject to a terminal disclaimer.

(21) Appl. No.: 12/256,355

(22) Filed: Oct. 22, 2008

(65) Prior Publication Data

US 2009/0052334 A1  Feb. 26, 2009

Related U.S. Application Data

(63) Continuation of application No. 11/050,945, filed on Feb. 7, 2005, now Pat. No. 7,506,196.

(51) Int. Cl.
*G06F 11/00* (2006.01)
(52) U.S. Cl. .............................. 714/4; 709/223; 709/224
(58) Field of Classification Search ........................ None
See application file for complete search history.

(56) References Cited

U.S. PATENT DOCUMENTS

| | | | |
|---|---|---|---|
| 4,376,973 | A | 3/1983 | Chivers |
| 5,230,047 | A | 7/1993 | Frey et al. |
| 5,684,807 | A | 11/1997 | Bianchini et al. |
| 5,835,697 | A | 11/1998 | Watabe et al. |
| 6,073,249 | A | 6/2000 | Watabe et al. |
| 2003/0023893 | A1 | 1/2003 | Lee et al. |
| 2005/0246569 | A1* | 11/2005 | Ballew et al. .................. 714/4 |

OTHER PUBLICATIONS

"Multi-Address Encoding for Multicast", Chi-Ming Chiang and Lionel M. Ni., Department of Computer Science, Michigan State University, A714 Wells Hall, Est Langsing, MI 48824-1027 [chiangm.ni]@cps.msu.edu.

USPTO Office Action dated Oct. 30, 2009 for U.S. Appl. No. 11/052,658.

\* cited by examiner

*Primary Examiner*—Yolanda L Wilson
(74) *Attorney, Agent, or Firm*—McGinn IP Law Group, PLLC

(57) ABSTRACT

A method (and system) for detecting at least one faulty object in a system including a plurality of objects in communication with each other in an n-dimensional architecture, includes probing a first plane of objects in the n-dimensional architecture and probing at least one other plane of objects in the n-dimensional architecture which would result in identifying a faulty object in the system.

3 Claims, 5 Drawing Sheets

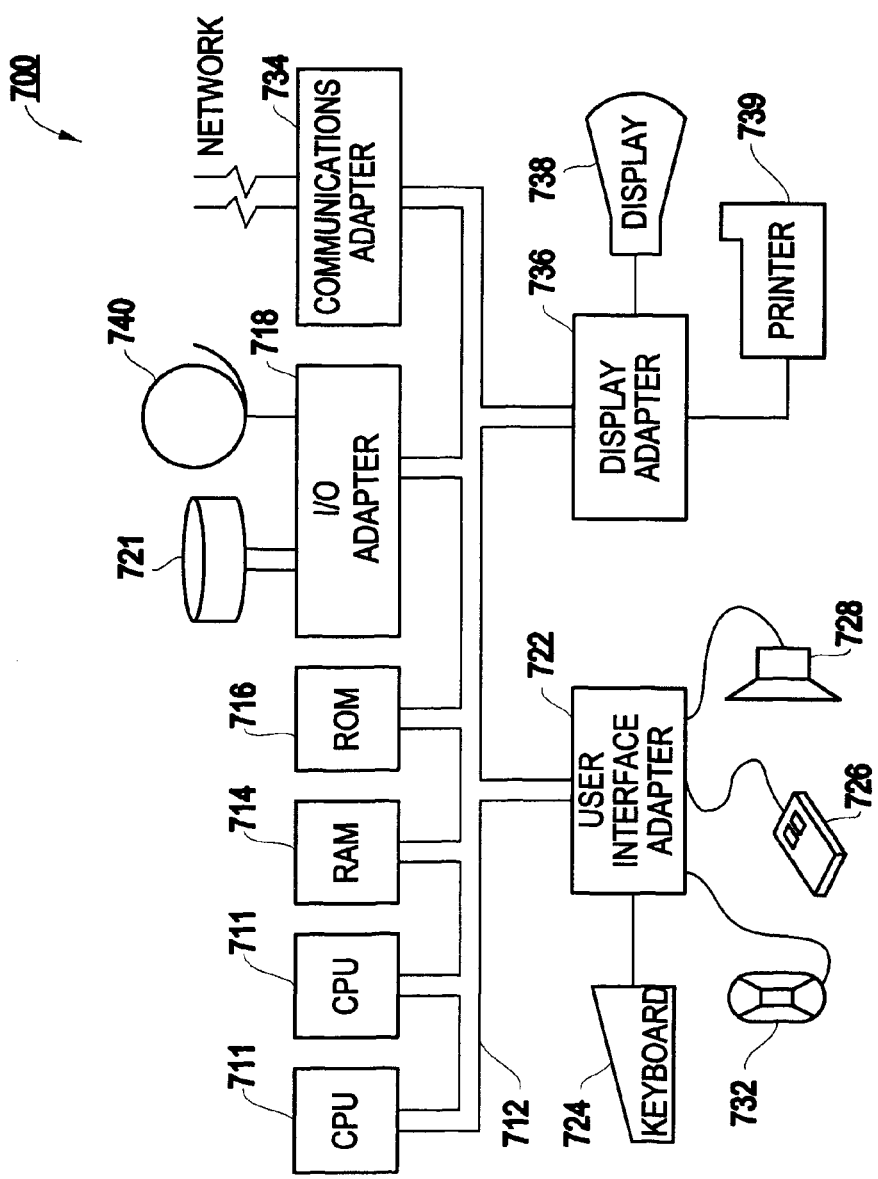

SYSTEM AND METHOD FOR DETECTING A FAULTY OBJECT IN A SYSTEM

CROSS-REFERENCE TO RELATED APPLICATIONS

This application is a continuation application of U.S. patent application Ser. No. 11/050,945, now U.S. Pat. No. 7,506,196, having filing date of Feb. 7, 2005, and issue date of Mar. 17, 2009.

This application is related to the following U.S. patent applications all filed on even date by Charles Jens Archer et al.: Ser. No. 11/052,658, entitled "ALL-TO-ALL SEQUENCED FAULT DETECTION SYSTEM", Ser. No. 11/052,659, entitled "CELL BOUNDARY FAULT DETECTION SYSTEM," Ser. No. 11/052,660, entitled "ROW FAULT DETECTION SYSTEM," Ser. No. 11/052,661, entitled "MULTI-DIRECTIONAL FAULT DETECTION SYSTEM," Ser. No. 11/052,663, entitled "BISECTIONAL FAULT DETECTION SYSTEM," and Ser. No. 11/052,662, entitled "ALL ROW, PLANAR FAULT DETECTION SYSTEM," each of which is assigned to the present assignee and is incorporated herein by reference, in its entirety.

STATEMENT REGARDING FEDERALLY SPONSORED RESEARCH OR DEVELOPMENT

This invention was made with Government support under Contract No.: B517552 awarded by the Department of Energy. The Government has certain rights in this invention.

BACKGROUND OF THE INVENTION

1. Field of the Invention

The present invention generally relates to a system and method for detecting a faulty object in a system including a plurality of objects in communication with each other in an n-dimensional architecture. For example, the exemplary methods and systems according to the present invention can detect a faulty processor via geometrically-aware power-on-self-tests, and/or detect and localize bad (e.g., faulty) processors and/or communication links in computing systems (e.g., parallel computing systems, telecommunication communication switching networks, etc.) which include a plurality of objects in an n-dimensional architecture based on statistically significant differences and intersecting lines of communication.

2. Description of the Related Art

In computing systems which are made up of a plurality of processors, it is desirable to be able to detect and locate faulty objects (e.g., hardware), such as processors (e.g., faulty nodes) and/or communications links in computing systems (e.g., parallel computing systems) which include a plurality of objects in an n-dimensional architecture. When a bad node/connection is found, the options generally are to replace the faulty hardware, employ fault tolerance of one sort if the data is being corrupted, employ fault tolerance of a second type if nodes need to be routed around, etc.

The related art methods generally use localized tests to find the faulty nodes. However, the related art methods do not work well, particularly, when the computing system gets very large. For example, if the architecture of the computing system (e.g., parallel computing systems) is such that the number of processors is greatly increased (e.g., 65,000 or more processors).

The related art methods do not scale well, provide only rough approximations as to the location of the faulty object(s) (e.g., faulty nodes and/or communications links), and/or take a long time to run, etc The related art methods have not addressed or solved the aforementioned problems.

SUMMARY OF THE INVENTION

In view of the foregoing, and other, exemplary problems, drawbacks, and disadvantages of the conventional systems and methods, an exemplary feature of the present invention provides a method and system which addresses and solves the aforementioned problems, among others.

The unique and unobvious features of the present invention are directed to a novel system and method for detecting a faulty object in a system including a plurality of objects in communication with each other in an n-dimensional architecture. For example, the exemplary methods and systems according to the present invention can detect a faulty processor via geometrically-aware power-on-self-tests, and/or detect and localize bad (e.g., faulty) processors and/or communication links in computing systems (e.g., parallel computing systems, telecommunication communication switching networks, etc.) which include a plurality of objects in an n-dimensional architecture based on statistically significant differences and intersecting lines of communication.

An illustrative, non-limiting aspect of the present invention is directed to a method for detecting a faulty object (or a plurality of faulty objects) in a system including a plurality of objects in communication with each other in an n-dimensional architecture. The method includes probing a first plane of objects in the n-dimensional architecture (e.g., probing a hyperplane, which includes two or more dimensions, such as sub-cubes and planes, for example, in a three-dimensional architecture, or in the exemplary case of a higher-dimensional architecture, probing hyper-sub-cubes and hyperplanes, etc.), and probing at least one other plane (e.g., hyperplane) of objects in the n-dimensional architecture which results in identifying a single faulty object in the system.

The system in which the exemplary methods and systems are employed can include, among other things, a computing system, a parallel computing system, a computing network, a telecommunications system, a switching network, a telecommunications switching network, etc. On the other hand, the plurality of objects in the n-dimensional architecture can include one or (or combinations of) processors, nodes (e.g., compute nodes), communications links, and/or switching devices, etc.

The exemplary systems and methods according to the present invention can detect one or more faulty processors, faulty nodes (e.g., faulty compute nodes), faulty communications links, and/or faulty switching devices, etc. That is, the exemplary system and method can detect a single faulty object, and/or narrow the faulty nodes down to a subset or subgroup of faulty nodes.

According to another exemplary aspect of the invention, if a faulty object cannot be detected and/or narrowed to a predetermined acceptable subset of objects on an entire partition of the n-dimensional architecture, then the process can be repeated to probe a first plane and at least one other plane in one or more sub-partitions of the n-dimensional architecture.

Somewhat similarly, if probing n−1 dimensions does not result in identifying the single faulty object, the exemplary system and method according to the invention can divide the n-dimensional architecture including the plurality of objects into a plurality of n-dimensional sub-architectures, each including a plurality of the objects. Then, a first plane of objects in one or more of the plurality of n-dimensional sub-architectures can be probed. Next, at least one other plane of objects in the plurality of n-dimensional sub-architectures can be probed, which would result in identifying the single faulty object (or subset of objects) in the system.

As mentioned above, the first plane and the other plane can include two-dimensional planes, hyperplanes, sub-hyperplanes, etc.

The first plane lies in any one of the dimensions of the n-dimensional architecture, such an n dimension of the n-dimensional architecture, an n−1 dimension of the n-dimensional architecture, an n−2 dimension of the n-dimensional architecture, an n−3 dimension of the n-dimensional architecture, and other than the n−1 dimension of the n-dimensional architecture, etc.

The other plane or planes also can lie in any one of the dimensions of the n-dimensional architecture, such as an n dimension of the n-dimensional architecture, an n−1 dimension of the n-dimensional architecture, an n−2 dimension of the n-dimensional architecture, an n−3 dimension of the n-dimensional architecture, and other than the n−1 dimension of the n-dimensional architecture, etc.

The n-dimensional architecture is not limited to any particular number of dimensions and can include, for example, a 3-dimensional architecture, a 2-dimensional architecture, and more than a 2-dimensional architecture, etc.

In another exemplary aspect of the invention, a method for detecting one or more faulty objects in a system including a plurality of objects in communication with each other in an n-dimensional architecture, includes probing at least two lower-dimensional sub-planes of objects of the n-dimensional architecture to determine at least one of a single faulty object and a predetermined acceptable subset of objects including the faulty object.

As with the other exemplary aspects described above, if the probing fails to determine a single faulty object or a predetermined acceptable subset of objects including the faulty object, then the method can apply a recursive process of probing sub-groups of the n-dimensional object until a single faulty object or a predetermined acceptable subset of objects including the faulty object can be determined.

In other words, an initial test may only detect that there is a problem. Then, the exemplary method can drop to lower and lower dimensions to find the problem. If dropping to lower and lower dimensions fails to work (e.g., due to the structure of the problem, such as the location of the bad nodes), then the exemplary methods and systems can repeat the process using sub-sets of the n-dimensional architecture (e.g., not the entire machine).

Additionally, to detect a faulty compute node, for example, the exemplary method can include an added step, such as a computation. Thus, the present invention is not only capable of detecting bad communication characteristics, but also can detect bad computational characteristics.

On the other hand, an exemplary system according to the present invention includes a plurality of objects in communication with each other in an n-dimensional architecture and a probing unit that probes at least two planes of objects in the n-dimensional architecture to identify a single faulty object in the system.

The system exemplarily includes a dividing unit that divides the n-dimensional architecture of the plurality of objects into a plurality of sub-partitions of the n-dimensional architecture, and/or a dividing unit that divides the n-dimensional architecture of the plurality of objects into a plurality of n-dimensional sub-architectures, each including a sub-group of the objects.

The aforementioned probing unit also can be capable of probing at least two planes of objects in one or more of the sub-partitions of the n-dimensional architecture to identify a single faulty object in the system, and/or probing at least two planes of objects in one or more of the n-dimensional sub-architectures to identify a single faulty object in the system.

For example, the probing unit can probe at least two lower-dimensional sub-planes of objects of the n-dimensional architecture to determine a single faulty object and/or a predetermined acceptable subset of objects including the faulty object. Then, the exemplary probing unit can recursively probe sub-groups of the n-dimensional object until a single faulty object and/or a predetermined acceptable subset of objects including the faulty object can be determined.

In another exemplary aspect of the invention, the system of detecting a faulty object in a system can include a plurality of objects in communication with each other in an n-dimensional architecture, and means for probing (e.g., one or more of a probing unit, a broadcasting unit, etc.) at least two planes of objects in the n-dimensional architecture to identify a single faulty object and/or a predetermined acceptable subset of objects including the faulty object in the system. The system also can include means for dividing (e.g., dividing unit) the n-dimensional architecture of the plurality of objects into a plurality of n-dimensional sub-architectures including sub-groups of the plurality of objects.

In one exemplary aspect, the means for probing is operable to probe at least two planes of objects in one or more of the n-dimensional sub-architectures to identify a single faulty object and/or a predetermined acceptable subset of objects including the faulty object in the system.

On the other hand, the present invention is directed to a signal-bearing medium tangibly embodying a program of machine-readable instructions executable by a digital processing apparatus to perform a method for detecting at least one faulty object in a system including a plurality of objects in communication with each other in an n-dimensional architecture, according to the exemplary aspects of the invention described herein.

Moreover, the present invention is directed to a method of deploying computing infrastructure in which computer-readable code is integrated into a computing system, and combines with the computing system to perform a method for detecting at least one faulty object in a system including a plurality of objects in communication with each other in an n-dimensional architecture, according to the exemplary aspects of the invention described herein.

The novel method and system according to the present invention detects and localizes bad (e.g., faulty) objects (e.g., processors and/or communication links, etc.) in a system (e.g., computing system, parallel computing system, telecommunication switching network/system, etc.). The present invention scales better than the related art methods and systems, identifies a location (e.g., a single location) of a faulty object(s) (e.g., a single faulty node (e.g., compute node), a single faulty communication link, and/or switching device, etc.), and/or takes less time to run than conventional systems and methods, etc.

The present invention has the advantage that it can detect and localize a single faulty object (e.g., faulty compute node, faulty communications link, faulty switching device, etc.). That is, the present invention is not effected by errors (e.g., transmittal errors) in the nodes surrounding the faulty node which may result due to the faulty node. On the other hand, the present invention can narrow the number of objects to a subset or sub-group of objects having a predetermined acceptable size, which include the faulty object or objects or, which are commonly affected by a structural problem, such as "dirty electricity", voltage surges, and/or adverse thermal conditions.

Thus, the present invention is capable of detecting and localizing more that one kind of error using the same test.

Moreover, the present invention does not require that a person manually search through a database to detect and localize the faulty node and/or communications link.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 7 illustrates an exemplary hardware/information handling system 700 for incorporating the present invention therein; and FIG. 8 illustrates a signal bearing medium 800 (e.g., storage medium) for storing steps of a program of a method according to the present invention.

DETAILED DESCRIPTION OF EXEMPLARY EMBODIMENTS OF THE INVENTION

Figure 1:
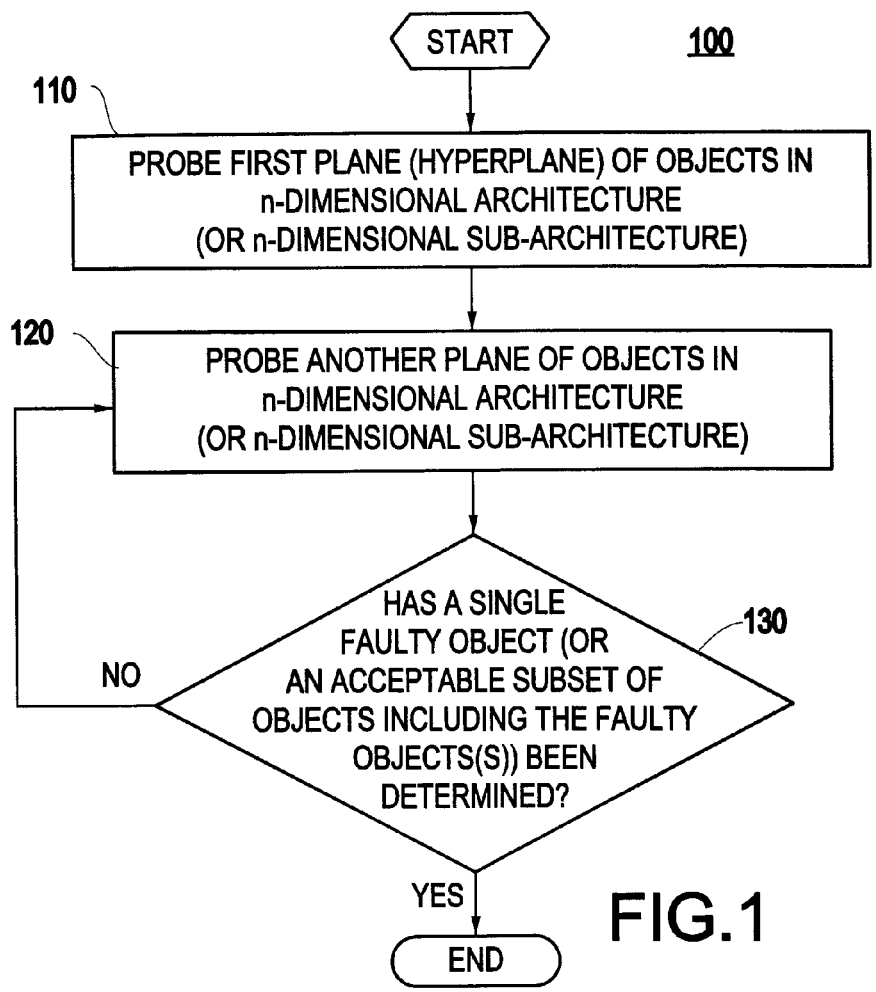
FIG. 1 illustrates a flowchart of an exemplary method 100 according to the present invention.

Referring now to the drawings, and more particularly to FIGS. 1-8, there are shown exemplary embodiments of the method and systems according to the present invention.

With reference to the Figures, the present invention generally relates to a system and method for detecting a faulty object in a system including a plurality of objects in communication with each other in an n-dimensional architecture. For example, the exemplary methods and systems according to the present invention can detect a faulty processor via geometrically-aware power-on-self-tests, and/or detect and localize bad (e.g., faulty) processors and/or communication links in computing systems (e.g., parallel computing systems, telecommunication communication switching networks, etc.) which include a plurality of objects in an n-dimensional architecture based on statistically significant differences and intersecting lines of communication.

Referring to FIG. 1, an exemplary method 100 according to the present invention detects a faulty object or objects in a system which includes a plurality of objects in an n-dimensional architecture.

For example, the exemplary method 100 probes a first plane (e.g., hyperplane) of objects in the n-dimensional architecture (e.g., step 110). The method then probes at least one other plane (e.g., hyperplane) of objects in the n-dimensional architecture (e.g., step 120).

The method 100 determines (e.g., step 130) whether the probing processes results in identifying a single faulty object in the system (e.g., whether a single faulty object, or an acceptable subset of objects, which include one or more faulty objects, can be determined). If so, the method may be terminated.

On the other hand, if a single faulty object (or an acceptable subset of objects, which include one or more faulty objects) is not identified or determined, then the exemplary method 100 can repeat the probing process for lower dimensions of the n-dimensional architecture. Alternatively, the n-dimensional architecture can be divided into a plurality of sub-architectures so that the probing process of the exemplary method 100 can be repeated for one or more of the sub-architectures, until a single faulty object (or an acceptable subset of objects, which include one or more faulty objects) is identified or determined.

For example, another exemplary method can probe a first plane of objects in the n-dimensional architecture, and then probe another plane of objects in the n-dimensional architecture. If a single faulty object (or an acceptable subset of objects, which include one or more faulty objects) has not been identified, then the exemplary method determines whether all of the lower dimensions have been probed. If not, then the exemplary method continues to probe other planes (e.g., hyperplanes) of objects in the n-dimensional architecture until a single faulty object is identified. When a single faulty object (or an acceptable subset of objects, which include one or more faulty objects) has been identified, the method may be terminated.

On the other hand, if all of the dimensions have been probed, but a single faulty object has not been identified, then the exemplary method may determines that a rare event has occurred (e.g., a number of faulty objects occur along the same diagonal of the n-dimensional architecture, which will be described in more detail below). To handle such rare events, the n-dimensional architecture can be divided into a plurality of n-dimensional sub-architectures or partitions and the process or probing can be repeated for the sub-architectures or partitions.

The ordinarily skilled artisan would understand that the sub-architectures could be divided into smaller architectures as many times such that only a single faulty object is identified in each sub-architecture. On the other hand, if more than one faulty object is located within a particular sub-architecture, then that sub-architecture (e.g., a first-level sub-architecture) can be divided into a plurality of sub-architectures (e.g., second-level sub-architectures). However, the remaining sub-architectures (e.g., first-level sub-architectures) may not need to be divided. Thus, the present invention can probe and be divided into various combinations of sub-architectures within the scope of the present invention.

Figure 2:
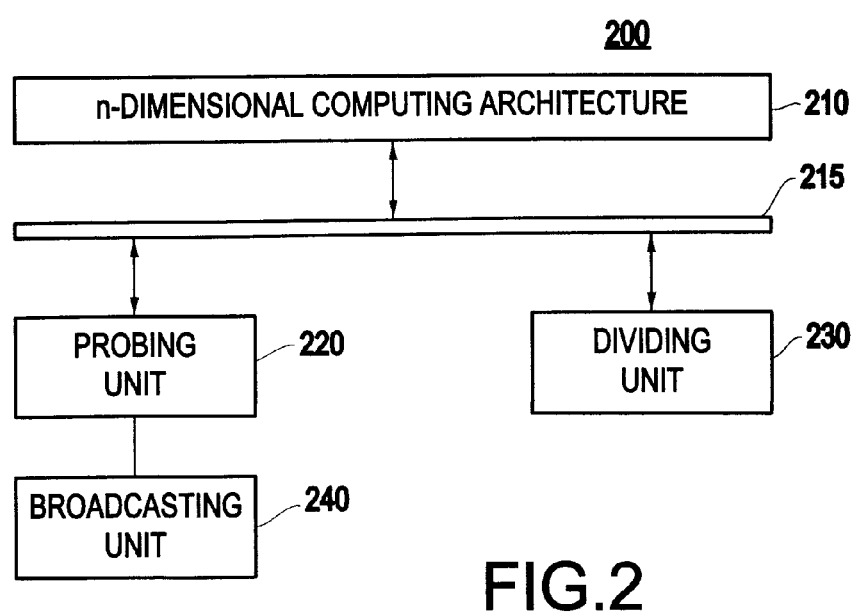
FIG. 2 illustrates an exemplary system 200 according to the present invention.

Referring to FIG. 2, an exemplary system 200 according to the present invention includes an n-dimensional computing architecture (e.g., 210) and a probing unit (e.g., 220). The exemplary system also may include a dividing unit (e.g., 230). The n-dimensional architecture (e.g., 210, for example, a computing architecture), the probing unit (e.g., 220), and/or the dividing unit (e.g., 230), may be coupled together by a bus 215 or the like. One of ordinary skill in the art would recognize that these units may be coupled together by any connector unit, such as a bus, a network (e.g., worldwide or local area), or the like.

As mentioned above, in computing systems which are made up of a plurality of processors, it is desirable to be able to detect and locate faulty hardware, such as processors (e.g., faulty nodes) and/or communications links in computing systems (e.g., parallel computing systems). When a bad node/connection is found, the options generally are to replace the faulty hardware, employ fault tolerance of one sort if the data is being corrupted, employ fault tolerance of a second type if nodes need to be routed around, etc.

The related art methods generally use localized tests to find the faulty nodes (e.g., faulty processors, etc.). However, the related art methods do not work well, particularly, in very large computing systems. For example, if the architecture of a computing system (e.g., a parallel computing system) is increased, then the number of processors may be greatly increased (e.g., 65,000 or more processors).

In the related art, the errors in one node would affect (e.g., spread to or contaminate) other nodes (e.g., the nodes surrounding the faulty node) so that only a rough approximation of the location or area of the faulty node can be obtained. Thus, the related art method would require refining the search to make sure that the area detected was the correct area (i.e., the area with the faulty node). This may be done by some iterative process to do a communication over some mesh of processors, and then localizing it further.

However, all of these processes according to the related art take much time, especially as the configuration gets larger and larger. Thus, the related art solutions do not scale well, particularly because of the large rise in the number of nodes and potential error. Moreover, the related art methods do not scale well in terms of the time per test and/or the number of tests that must be performed.

Additionally, the related art methods do not take advantage of dimensionality for scaling.

On the other hand, other related art methods may rely upon known or expected values, such as fixed values for expected communication times.

Generally, the related art methods are quite complex and hard to port between systems.

Hence, the related art methods do not scale well, provide only rough approximations as to the location of the faulty object(s) (e.g., faulty processors, nodes, communications links, switching devices, etc.), and/or take a long time to run, etc.

As mentioned above, often some part of a highly parallel computer system has some fault in it that relates to communications. It is often difficult, on a large system, to pinpoint that fault. It is even more difficult to do so quickly (in a scalable manner).

The exemplary aspects of the present invention address the aforementioned problems and solve the scalability issue by taking advantage of the massive parallelism of the machine. At the same time, the exemplary aspects of the present invention use collective communications that stress the hardware so as to reveal weak points in the communications fabric.

The unique and unobvious features of the present invention are directed to a novel system and method for detecting a faulty processor via geometrically-aware power-on-self-tests, and more particularly, to a system and method for detection and localization of bad (e.g., faulty) processors and/or communication links in computing systems (e.g., parallel computing systems) which addresses and solves the aforementioned problems, among others.

That is, the novel method and system according to the present invention detects and localizes bad (e.g., faulty) objects (e.g., processors and/or communication links, etc) in systems including a plurality of objects in communication with each other (e.g., parallel computing systems, telecommunications switching networks, etc.). The present invention scales better than the related art methods and systems, identifies a single location of faulty object(s) (e.g., a single faulty node and/or a single faulty communication link), and/or takes less time to run than conventional systems and methods, etc.

As mentioned above, the present invention has the advantage that it detects and localizes a single faulty node or a single faulty communications link. That is, the present invention is not affected by errors (e.g., transmittal errors) in the nodes surrounding the faulty node which may result from the faulty node. Moreover, the present invention does not require that a person manually search through a database to detect and localize the faulty node and/or communications link. Further, the present invention is capable of detecting and localizing more that one kind of error using the same test.

Figure 3A:
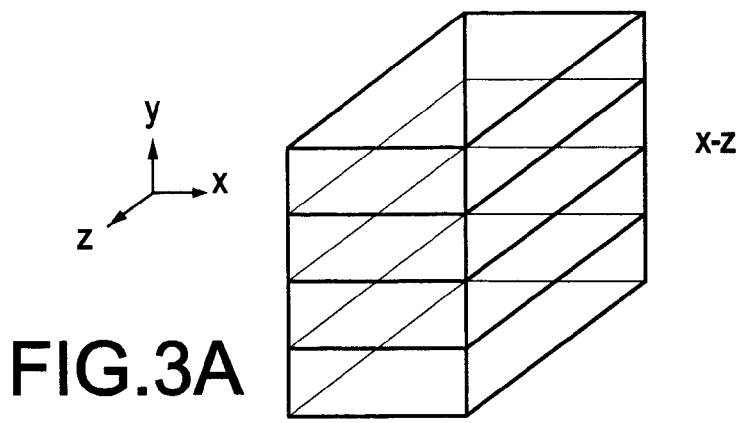
FIGS. 3A-3C graphically illustrate planes of objects in each dimension of a 3-dimensional architecture of a computing system according to an exemplary aspect of the present invention.
Figure 3B:
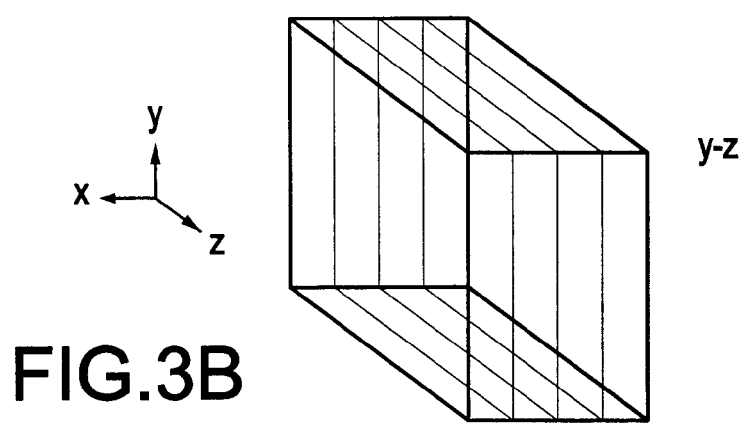
Figure 3C:
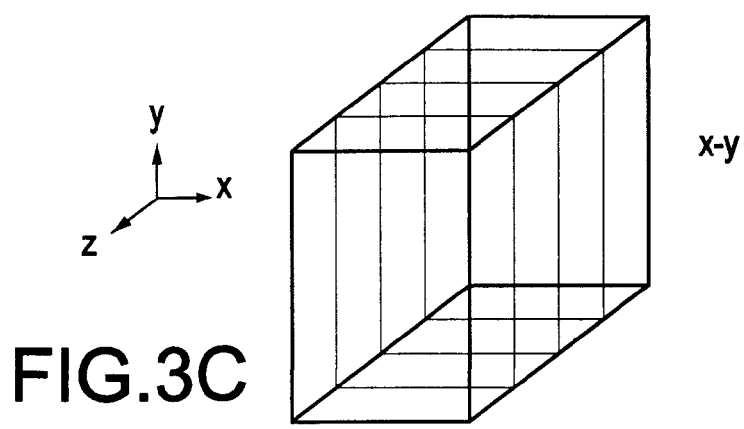

With reference again to the Figures, FIGS. 3A-3C graphically illustrate that a three-dimensional architecture (e.g., a cube) can exemplarily be divided into a plurality of planes in each of the three dimensions.

For example, as shown in FIG. 3A, the exemplary 3-dimensional architecture can be divided into a plurality of planes lying in the x-z plane of the architecture. Similarly, as shown in FIGS. 3B and 3C, the exemplary 3-dimensional architecture can be divided into a plurality of planes lying in the y-z plane of the architecture, and/or a plurality of planes lying in the x-y plane of the architecture.

Figure 4:
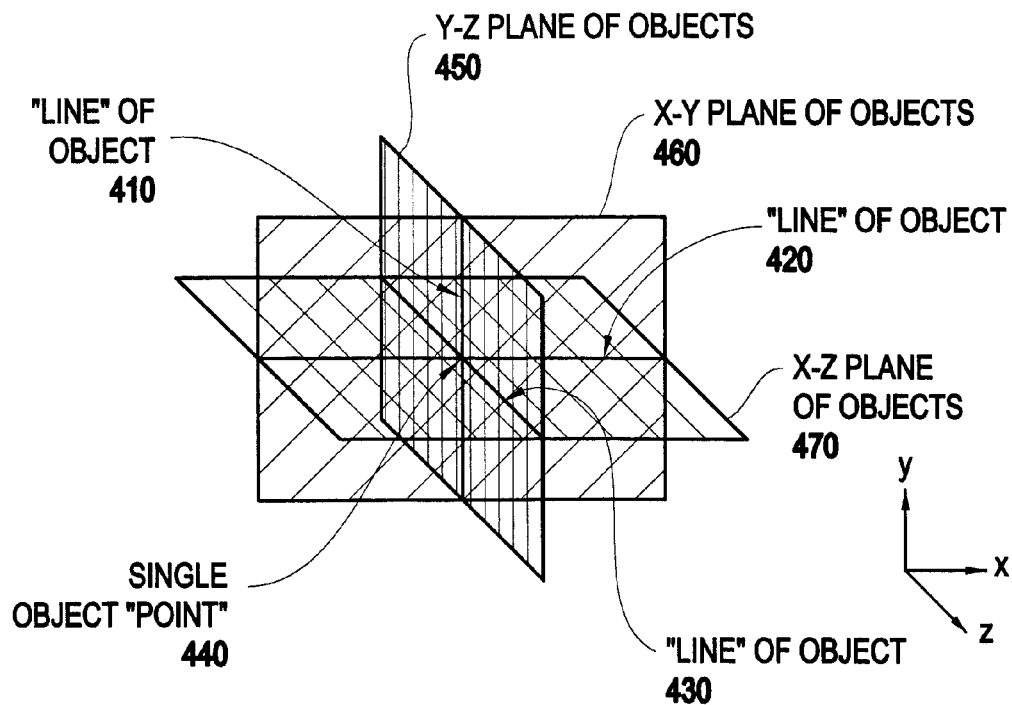
FIG. 4 geometrically illustrates the intersection of planes of objects of a computing system according to an exemplary aspect of the present invention.

Thus, in an exemplary 3-dimensional computing architecture as shown in FIG. 4, there are three planes of interest: X-Y (e.g., plane 460), Y-Z (e.g., plane 450), and X-Z (e.g., plane 470). The intersection of any two planes forms a line (e.g., a "line" of objects 410, 420, 430), while the intersection of any three planes forms a point (e.g., 440).

In the presence of faulty nodes and/or faulty transmission lines, using broadcasts inside these planes will result in corrupted data, long transmission times (due to automatic retransmission in new machines), or both. Thus, the present invention uses this information (e.g., the broadcasts) to determine the location of faulty node(s) in the system. In other words, the present invention probes the planes using broadcasts inside the planes.

For purposes of this exemplary aspect, it is assumed that the fault-type impacts performance only (many re-transmits are required or a transmission never completes, e.g., or times out). It is also assumed that each node exists as a part of three planes. Further, it is assumed that each node has statistics regarding how long broadcasts take in each of these planes. Thus, both for the subject node and for each of the neighboring nodes of the subject node, the statistics can be constructed and used as baseline values.

On power-up (or during a brief maintenance downtime) of the computing system, an n-dimensional machine can perform n+1 broadcasts. For example, in a 3-dimensional machine according to an exemplary aspect of the present invention, the results from each of the three rounds of broadcast can be sent around during the next round of broadcast. The misbehaving nodes can report themselves as such (or, fearing that they are too damaged for that, multiple nodes can report the bad nodes, exponentially reducing the chance of missing such a report).

Figure 5:
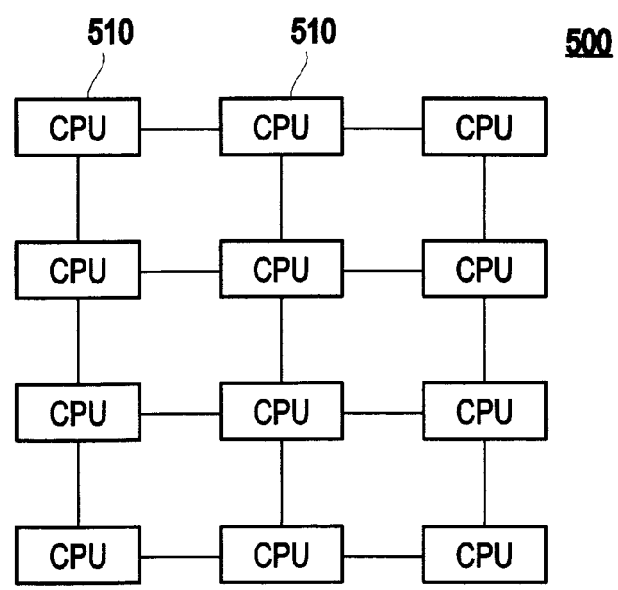
FIG. 5 illustrates a plane of objects 500 of an n-dimensional computing system according to an exemplary aspect of the present invention.
Figure 6A:
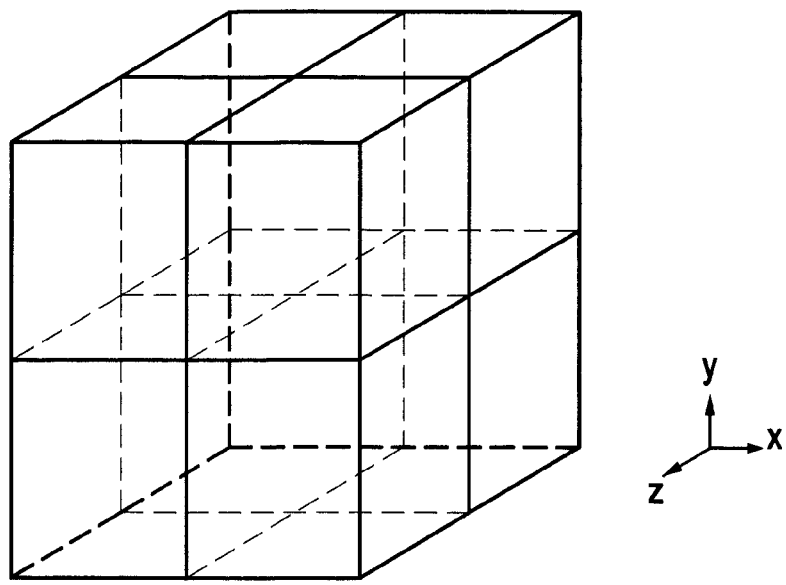
FIGS. 6A and 6B geometrically illustrate an n-dimensional architecture including a plurality of n-dimensional sub-architectures according to an exemplary aspect of the present invention.
Figure 6B:
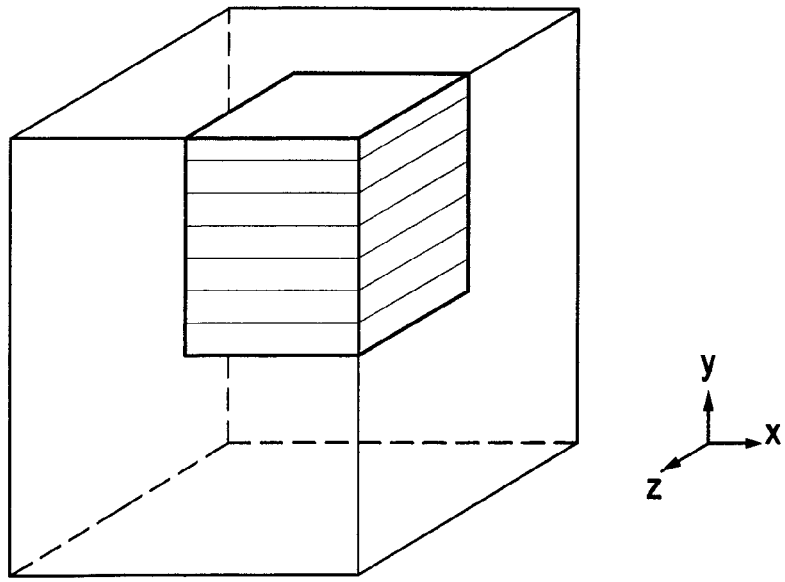

For example, the nodes could all engage in X-Z broadcasts, followed by X-Y, then Y-Z. Referring again to the figures, FIG. 5 illustrates an exemplary plane 500 of nodes (e.g., processors 510).

During the first stage, data of some format (e.g., "agreed upon" bit patterns) is broadcast to each node in the plane. Further, during each broadcast in a stage, the root node can change (run through the entire plane) to add a secondary level of stress and detection coverage. In the first stage, the data is checked for correctness (e.g., all nodes "know" that the data broadcast consists of the values 1.01, 2.02 . . . , etc., or any viable pattern)(it is likely that this is effective (e.g., most effective) when the bit patterns are dictated) and timing statistics are collected.

In some exemplary aspects of the invention, it may be important to determine both the correctness of the data and the timing values because trusting broadcasts that corrupt data could lead to erroneous conclusions. In other words, it may be better to conclude nothing at all in such cases.

During the next two stages, the same "error-checking" broadcast is performed and the statistics collected from the previous stage are disseminated along the perpendicular planes (broadcast). In the final phase (e.g., the d+1st phase) only the statistics from the previous phase are broadcast (e.g., the first phase was active on the same plane and only was able to perform the error checking phase).

At this point, all nodes have a record of the time taken for broadcasts in every plane of the machine, through each rotation. As an enhancement, flags may be set to indicate the nodes whose statistics are not to be believed (e.g., due to the fact that broadcasts involving that node, in some plane or planes, resulted in corrupted data).

With this information, and the data that they must have in relation to the physical<->logical mapping of machine<-> communication channels, it is possible to determine the physical location of bad nodes and/or faulty links according to the present invention.

With reference again to FIG. 4, according to the exemplary aspects of the present invention, if the intersecting planes do not result in a single point (or set of points), the same method can be applied (to lower dimensionalities) to detect faults. That is, the n-dimensional architecture can be divided into a plurality of n-dimensional sub-architectures (e.g., sub-cubes), as graphically illustrated in FIG. 6A. As explained below, the planes of each of the sub-architectures (e.g., sub-cubes) can be separately probed according to the present invention. For example, FIG. 6B graphically illustrates an exemplary sub-cube divided into a plurality of x-z planes.

It is noted, however, that in the vast majority of cases there will be only one bad (e.g., faulty) node/link (e.g., processor, communications link, etc.) for an initially stable system. The number of faulty nodes/links should follow an exponentially tapering probability curve (if the probability of 1 is 1%, then the probability of 2 is 0.01%, etc.). Given the positioning required to blur this 3-dimension at all, it is unlikely that these steps will be taken.

However, should such a situation occur, the present invention is capable of addressing and solving the problems associated with this situation.

For example, assume a 6-link (3-D toroidal) system. The plane broadcasts use 4 links out of each node above. However, the plane broadcasts can be decomposed into two rounds of independent line broadcasts (e.g., perpendicular lines). This gets around the problem of "blurring" by particular (e.g., physical) configurations of the bad nodes.

It is noted that, although the aforementioned method could be employed from the beginning, the time taken and the amount of coordination required (timing) in such a system is far less and far simpler with the plane broadcasts. Further, the plane broadcasts press harder on such things as dynamic packet routing and, in general, simply push the system harder.

On the other hand, another approach (i.e., not dropping the dimensionality of the broadcasts) would be to reduce the size of the sub-cubes. This is useful if the original diagnostic test yields a result "all nodes potentially bad" (as it would if all <x,x,x> diagonal nodes were bad). If the result is that some sub-cube is bad, then using line broadcasts only on that sub-cube would combine the detective power of the line method with the efficiency of the plane method (since the time coordinating a smaller cube is far simpler and more efficient).

There are a few cases where the (hyper) plane solution described above is not sufficient (even under the assumption that errors are persistent and non-data corrupting). If there are faulty nodes in each plane (e.g. bad nodes at <1,1,1>, <2,2,2>, etc.), then some of the solutions described above may not be beneficial to identifying the faulty node/link (assuming that all faults are of the same type). Otherwise, the exemplary aspects of the present invention will detect the "faultiest" processor will be detected first, etc.

Thus, there are highly-related aspects of the invention that will detect bad nodes (and give their position) even in the presence of faulty nodes that are positioned in the rare case/instance (e.g., bad geometry) described above.

The ordinarily skilled artisan would understand that, even though the exemplary aspects of the present invention primarily target performance-impacting faults in the hardware (i.e., faults that impact performance, but not the correctness of communicated data), the present invention also is applicable to many persistent (non-Byzantine) fault-types whose effect is corrupted data.

FIG. 7 illustrates an exemplary hardware/information handling system 700 for incorporating the present invention therein; and FIG. 8 illustrates a signal bearing medium 800 (e.g., storage medium) for storing steps of a program of a method according to the present invention.

FIG. 7 illustrates a typical hardware configuration of an information handling/computer system for use with the invention and which preferably has at least one processor or central processing unit (CPU) 711.

The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communication adapter 734 for connecting an information handling system to a data processing network, the Internet, an Intranet, a personal area network (PAN), etc., and a display adapter 736 for connecting the bus 712 to a display device 738 and/or printer.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This signal-bearing media may include, for example, a RAM contained within the CPU 711, as represented by the fast-access storage for example. Alternatively, the instructions may be contained in another signal-bearing media, such as a magnetic data storage diskette 800 (FIG. 8), directly or indirectly accessible by the CPU 711.

Whether contained in the diskette 800, the computer/CPU 711, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Thus, the illustrative, non-limiting embodiments of the present invention as described above, overcome the problems of the conventional methods and systems, and The unique and unobvious features of the present invention are directed to a novel system and method for detecting a faulty processor via geometrically-aware power-on-self-tests, and more particularly, to a system and method for detection and localization of bad (e.g., faulty) processors and/or communication links in computing systems (e.g., parallel computing systems) which addresses and solves the aforementioned problems, among others.

With the unique and unobvious features of the present invention, the novel system and method for detecting and localizing bad (e.g., faulty) processors and/or communication links, for example, in parallel computing systems, telecommunication switching networks, etc., provides advantages over the related art methods. For example, the present invention scales better than the related art methods and systems, identifies a single location of faulty object(s) (e.g., a single faulty node and/or a single faulty communication link), and/or takes less time to run than conventional systems and methods, etc.

The present invention also has the advantage that it detects and localizes a single faulty node or a single faulty communications link. That is, the present invention is not effected by errors (e.g., transmittal errors) in the nodes surrounding the faulty node which may result from the faulty node. Moreover, the present invention does not require that a person manually search through a database to detect and localize the faulty node and/or communications link. Further, the present invention is capable of detecting and localizing more that one kind of error using the same test.

The present invention is not limited to computing systems, telecommunication switching networks, etc., but also is applicable to other systems, such as systems which can be graphed with intersecting points of some n-dimensional topology where one keeps a record of communications along the lines.

The present invention also provides the ability to use known performance information (e.g., a database of known performance) and to adjust to changes in the system to differentiate "acceptable" and "unacceptable" behavior. For example, in a distributed system (e.g., the exemplary phone network system), it may be the case that the system has become progressively congested and the witnessed performance is not good, but it is what can be had. Thus, the present invention can determine that such is the case.

Moreover, faulty processors (in general) lead to faulty results. However, the present invention can keep track of the nature of the faulty results.

Further, the collective nature of the exemplary systems (and methods) according to the present invention can be used to detect certain kinds of machine problems that are difficult to detect with the related art methods.

For example, if the exemplary method detects that a plane (e.g., hyperplane) or part of a plane (e.g., part of a hyperplane) is bad (e.g., faulty), the exemplary method can be used to determine whether all of the bad nodes/links share a common problem, such as a common power source that is bad (e.g., "dirty electricity", voltage fluctuations, etc.), and/or thermal conditions (e.g., which may result from an inoperable or faulty cooling fan), etc.

While the invention has been described in terms of several preferred embodiments, those skilled in the art will recognize that the invention can be practiced with modification within the spirit and scope of the appended claims.

Further, it is noted that, the inventors' intent is to encompass equivalents of all claim elements, even if amended later during prosecution.

What is claimed is:

1. An apparatus for detecting at least one faulty object in a system including a plurality of objects in communication with each other in an n-dimensional architecture, the apparatus comprising:

a probing unit that probes at least two lower-dimensional sub-planes of objects of said n-dimensional architecture, as units of sub-planes, to determine at least one of a faulty object and a predetermined acceptable subset of objects including said faulty object.

2. The apparatus according to claim 1, wherein said probing unit recursively probes sub-groups of the n-dimensional object until at least one of said faulty object and said predetermined acceptable subset of objects including said faulty object can be determined.

3. A non-transitory signal-bearing storage medium tangibly embodying a program of machine-readable instructions executable by a digital processing apparatus to perform a method for detecting at least one faulty object in a system including a plurality of objects in communication with each other in an n-dimensional architecture, the method comprising:

probing a first plane of objects in said n-dimensional architecture; and probing at least one other plane of objects in said n-dimensional architecture which results in identifying a faulty object in said system.

* * * * *